Aug. 30, 1949.    A. H. KIRKSEY    2,480,483
FIFTH-WHEEL CONSTRUCTION FOR SERVICE LINE COUPLINGS
Filed Dec. 26, 1944    2 Sheets-Sheet 1
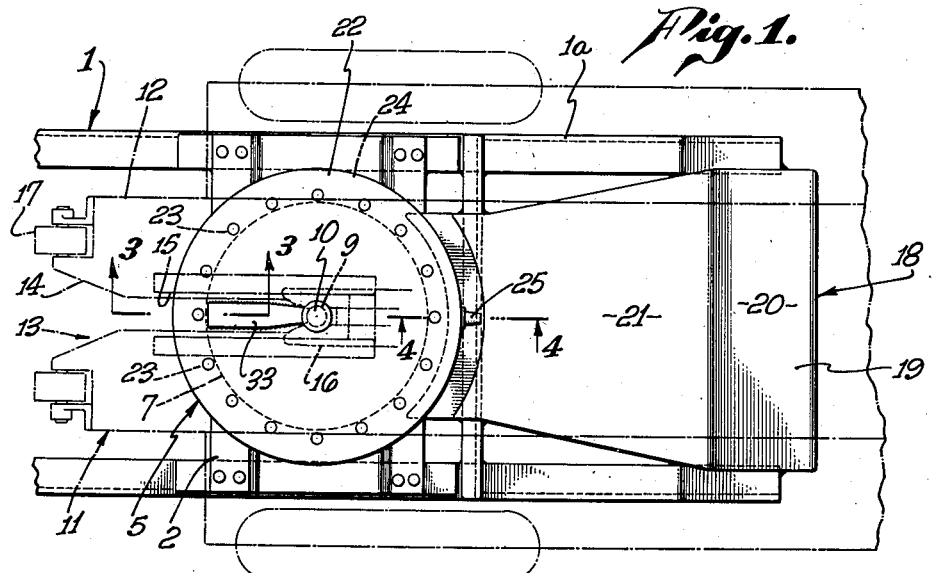
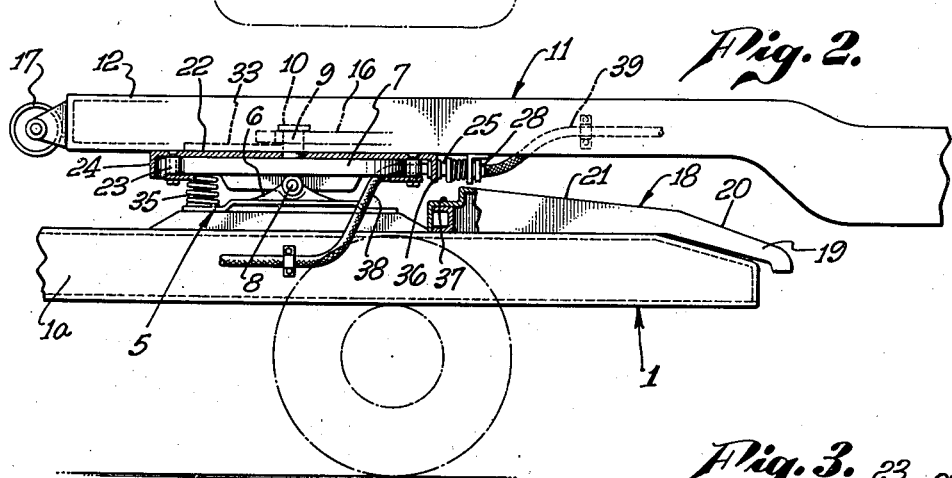
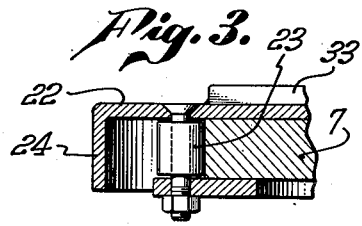
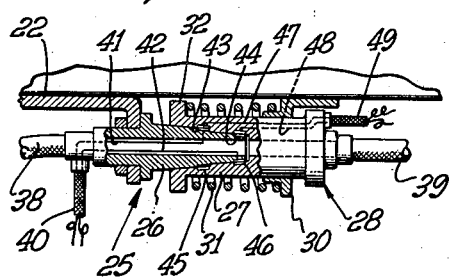
Amos H. Kirksey,
INVENTOR.
BY Francis D. Ammen
his ATTORNEY.

Aug. 30, 1949.  A. H. KIRKSEY  2,480,483
FIFTH-WHEEL CONSTRUCTION FOR SERVICE LINE COUPLINGS
Filed Dec. 26, 1944  2 Sheets-Sheet 2

Amos H. Kirksey,
INVENTOR.

BY Francis D. Ammen
his ATTORNEY.

Patented Aug. 30, 1949

2,480,483

UNITED STATES PATENT OFFICE 2,480,483

FIFTH-WHEEL CONSTRUCTION FOR SERVICE LINE COUPLINGS

Amos H. Kirksey, Los Angeles, Calif.

Application December 26, 1944, Serial No. 569,799

9 Claims. (Cl. 280—33.05)

This invention relates to trucks and trailers and particularly to a type of trailer and truck in which the truck or towing vehicle is connected up automatically to the trailer by backing it under the forward end of the trailer body, at which point mechanism is provided for effecting a disconnectable connection between the two.

Such trailers are provided with fluid-operated brakes, usually of pneumatic type, and also carry lights on lighting circuits, and it is the present practice to provide hose connections leading from a compressed air reservoir on the truck and from the brakes of the trailer, to a point near the disconnectable connection where the hoses are provided with coupling members that are coupled together by hand after the draft connection has been completed. Lighting circuit couplings are also provided that must be coupled by hand. One of the objects of this invention is to provide automatic means for effecting the coupling together of the two hose coupling members referred to above, and the automatic closing of the lighting circuit to the trailer when the towing vehicle is backed in to the trailer.

One of the difficulties involved in effecting an automatic connection between the couplings on the hose ends is, that there is almost sure to be imperfect alignment between the longitudinal axes of the truck and the trailer when the truck is backed into its position to interlock and connect itself to the forward end of the trailer frame. One of the objects of this invention is to provide means for mounting one of these coupling members so that it will automatically align itself with the other coupling when the draft connection is being established between the truck and the trailer.

The disconnectable connection referred to above that is effected between the truck or towing vehicle and the forward end of the frame of the trailer, involves a fifth-wheel construction located on the truck, and the means for effecting the connection to this fifth-wheel usually includes a kingpin located on the fifth-wheel; and the forward end of the trailer frame is provided with a clamping mechanism that usually presents two opposed jaws that move into position opposite each other on the kingpin and which enable the traction or force that pulls the trailer to be imparted to the trailer through the kingpin. The fifth-wheel construction of course permits the combined truck and trailer to turn around corners and enables the combination of the truck and trailer to be substantially as dirigible as an ordinary truck.

In the preferred embodiment of the invention, I mount one of the couplings in a fixed position or at least on a fixed axis on the trailer, and one of the objects of the invention is to provide means for supporting the other coupling so that it is capable of being held in a position in which it is centered, or aligned, with the trailer coupling when these two couplings are brought together; in this way, the hose connection is completed to the trailer brakes, and the lighting circuit to the trailer lights is established.

Further objects of the invention will appear hereinafter.

The invention consists in the novel parts and combination of parts, to be described hereinafter, all of which contribute to produce an efficient fifth-wheel construction for a brake line and lighting circuit coupling.

A preferred embodiment of the invention is described in the following specification, while the broad scope of the invention is pointed out in the appended claims.

In the drawings:

Fig. 1 is a plan showing the rear end of the towing vehicle or truck frame broken away, and showing also in dotted lines the forward end of the trailer frame coupled to the truck frame and with the fifth wheel construction indicated in plan.

Fig. 2 is a side elevation of the rear end of the truck illustrated in Fig. 1 with certain parts broken away and shown in section. This view also shows the forward end of the trailer frame in position as though locked to the kingpin of the fifth-wheel.

Fig. 3 is a section taken about on the line 3—3 of Fig. 1 and passing radially through the edge of the fifth-wheel, illustrating a fifth-wheel plate that I employ as a carriage for the forward hose coupling.

Fig. 4 is a view similar to Fig. 3 and is a section taken about on the line 4—4 of Fig. 1, illustrating the manner in which the forward hose coupling is mounted on its carriage, and also illustrates the hose coupling of the trailer connected to the truck's hose coupling.

Before proceeding to a more detailed description of the invention it should be stated that in its preferred embodiment the trailer hose coupling is mounted in a fixed position forwardly on the trailer frame on the central axis of the trailer, and where the disconnectable connection is located between the trailer and the truck. The other hose coupling is mounted on a carriage that is capable of shifting it laterally with respect to the longitudinal axis of the truck. The specific construction of this carriage and manner of mounting it enables it to be shifted laterally, and of course in practice would depend somewhat on the type and design of the disconnectable draft connection between the truck and the trailer.

In the present instance I have illustrated the invention as applied to a common type of truck employing a fifth-wheel construction and a kingpin, so constructed as to enable the rear end of the truck to be backed under the trailer, in such a way that the kingpin will pass between two jaws that clasp it, and which can thereafter impart the tractive force to the trailer.

Figure 5:
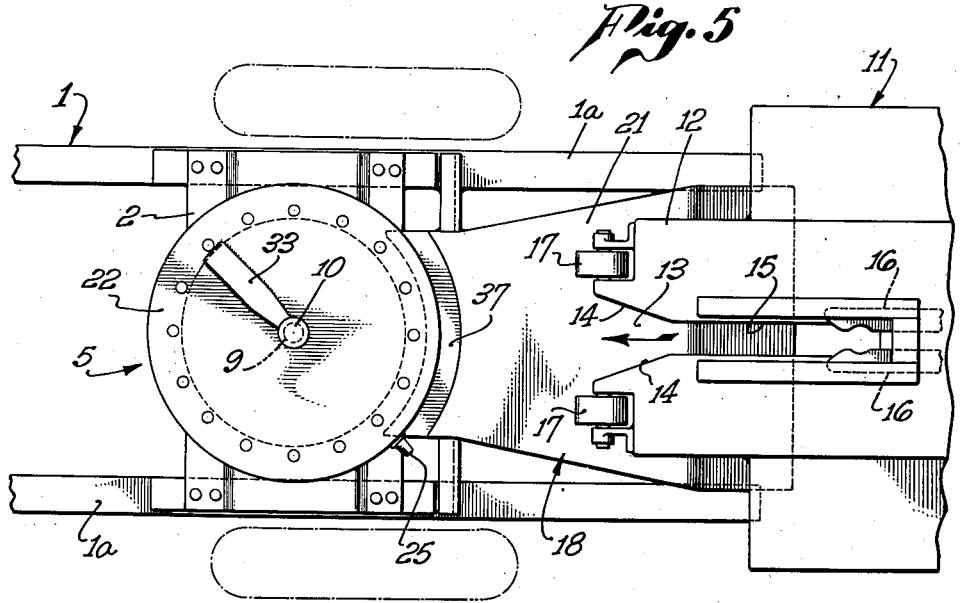
Fig. 5 is a plan similar to Fig. 1 but showing the forward end of the trailer frame projecting over the rear end of the truck, as it would be when the truck is in the act of being backed into position to effect its draft connection to the trailer.

Referring more particularly to the parts, and to Fig. 5, 1 indicates the rear end of the truck chassis, or frame of a tractor vehicle, comprising side frame bars 1a, 1a, between which a crosshead construction 2 is provided to support a fifth-wheel construction or unit 5 shown in side elevation in Fig. 2. This fifth-wheel construction includes a superstructure 6 (see Fig. 2) on which the fifth-wheel disc 7 is mounted to rock on transversely disposed trunnions 8, one on each side; and the upper side of this fifth-wheel disc 7 is provided with a kingpin 9 that has the usual enlarged head 10 at its upper end.

The forward end 11 of the trailer frame is provided with a draft-head 12 including a longitudinally disposed plate having a throat 13 at the forward end with side edges 14 that converge in a rearward direction, and this throat leads back into a longitudinally disposed slot 15.

In Fig. 5 the truck frame is shown in true alignment with the forward end of the trailer; but in practice, when backing the truck into position, the truck and trailer could still be coupled together even if they were considerably out of alignment with each other; and that is the reason for the provision of the throat 13 that is amply wide to enable it to guide the kingpin 9 back into the slot 15. And at the rear end of the slot 15 the kingpin passes in between two jaws 16 shown in dotted lines in Fig. 5 that snap over opposite sides of the kingpin and clasp it firmly, so that the kingpin can pull the trailer through the medium of these jaws and their anchorage to the trailer. To facilitate the effecting of this coupling between the truck and the trailer, the forward end of the coupling-head 12 is provided with two small wheels or rollers 17, and when the truck backs into position the undersides of these rollers are engaged by an inclined ramp or guide 18 located at the back of the truck and having the general form of a wide apron at its rear portion 19 to present a guide face 20 that is disposed at a slightly greater angle or inclination than the upper face or main face 21 of this ramp. These wheels 17 ride up this ramp and raise the frame 11 of the trailer to the level of the kingpin 9, and support it until the under side of this frame rests upon a seat plate or carriage 22 which overlies the fifth-wheel disc 7.

This carriage plate 22 is mounted for orientation on the axis of the kingpin 9, and is of substantially circular form like the disc 7; furthermore, it is provided with an anti-friction bearing on the edge of this disc 7 through the agency of a plurality of circumferentially spaced rollers 23 the sides of which bear against the periphery of the disc.

The carriage plate 22 in the present instance is formed with a downwardly projecting flange 24 and I may use this flange as a support for the forward hose coupling 25 (see Fig. 4). This coupling or coupling head 25 terminates in a tapered nozzle 26 which is received in a similarly tapered socket 27 that constitutes the body of the trailer coupling head or coupling 28. This coupling 28 is preferably mounted so that it can yield in a rearward direction when the two couplings are brought together. For this purpose the body of this coupling is mounted to slide back in an opening in a vertical web of a bracket 30, the horizontal flange of which is attached to the under side of the frame 11.

A coil spring 31 is disposed around the body of the coupling 28 to thrust against a collar 32 at the forward end of this body so as to resist the force thrusting the tapered nozzle 26 into the socket coupling 27. This flexible mounting for the coupling 28 is advantageous as it enables the couplings to adapt themselves to changes in road level or grade under the truck and trailer; and of course by reason of the fact that the carriage 22 is freely rotatable on the axis of the kingpin this coupling connection will be maintained intact when the truck and trailer are turning corners.

Figure 6:
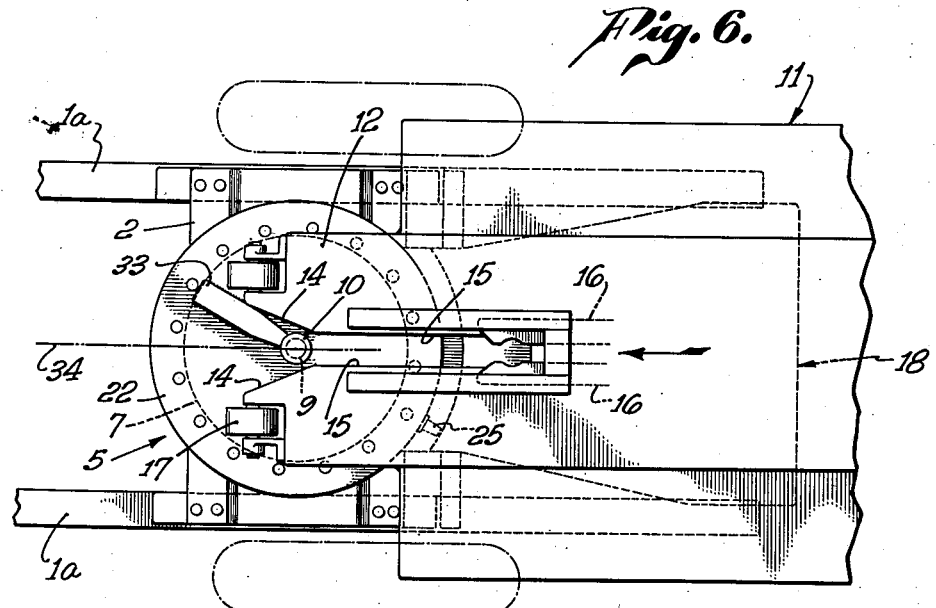
Fig. 6 is a view similar to Fig. 5 but showing the truck frame and the trailer frame at a further stage of the backing movement of the truck, and further illustrates the means that I employ associated with the fifth-wheel construction for insuring perfect alignment of the hose couplings as they come together.

In order to insure that the two hose couplings will be brought into alignment with each other when the truck is backed in under the forward end of the trailer, the upper side of the seat plate or coupling carriage 22 is provided with a radially disposed abutment or rib 33 (see Figs. 5–6), and the manner in which this rib operates to effect the alignment of the truck hose coupling on the central axis 34 of the truck is indicated clearly in Fig. 6. This alignment is effected through the agency of the converging edges 14 of the throat 13. This rib or abutment 33 is of substantially the same width as the slot 15 so that when the truck has completed its backing movement for coupling it to the trailer this rib operates as a key or aligner to hold the carriage plate 22 in its perfectly aligned position, with the truck's hose coupling 25 held on the axis 34; and of course this means this coupling will be in line with the relatively fixed coupling 28 on the trailer.

A fifth-wheel construction such as described is usually provided with a forwardly disposed coil spring 35 (see Fig. 2) that will normally hold the fifth-wheel disc 7 and seat plate or carriage 22 in an inclined position, and this is the position of these parts when the truck has been backed under the forward end of the trailer. At this time the lower and rear edge 36 of the flange 24 will rest upon a shoulder 37 at the forward end of the ramp 18, which will hold the upper face of the seat plate 22 in an inclined position similar to that of the inclined face 21, so as to facilitate the rollers 17 rolling from the ramp onto the upper face of the seat plate. As indicated in Figure 1, the shoulder 37 extends around in an arc 21a so that an arcuate recess is formed in which the nozzle 25 will have clearance at all times, and regardless of what position the carriage 22 is in. When the towing vehicle or truck is backed under the forward end of the trailer, the wheels 17 roll across this arcuate depression, or recess, and across the upper face of the coupling carriage 22. As soon as these wheels 17 pass off of the forward edge of the carriage 22 the bottom face of the forward end 11 of the trailer frame engages the upper face of the coupling carriage 22 and lies flatly against the same. This aligns the coupling 25 with the coupling 28 on the trailer as to elevation, and of course, the converging edges 14 of the throat 13 will have engaged the radial abutment or rib 33 on the upper face of the coupling carriage 32 and will have oriented the coupling carriage so that the coupling 25 is in axial alignment with the coupling 28.

The truck hose-coupling 25 is of course connected to a freely movable hose end 38, and this connects the forward end of the brake line to a driver's air valve (not illustrated). A similar hose 39 connects to the trailer coupling 28 and extends rearwardly to the trailer brakes to complete the brake line.

The coupling illustrated is a combined hose and electric light coupling in which an electric cord 40 is attached to the part 25, the two wires 41 and 42 of which lead in and connect respectively to two contact rings 43 and 44 molded into the insulating coupling body 25.

The rings 43 and 44 seat against similar contact rings 45 and 46 molded into the female coupling 27 and connected by embedded lead wires 47 and 48 to an electric cord 49 that is connected to the lamp circuit of the trailer.

In some truck-and-trailer types, the fifth wheel is mounted on the trailer instead of on the towing vehicle. In adapting the invention to that type, the coupling member 26 would be carried on the forward edge of a carriage plate corresponding to the carriage 22, and the relatively fixed coupling corresponding to the coupling 27 would be mounted on the rear end of the towing vehicle.

Many other embodiments of this invention may be resorted to without departing from the spirit of the invention.

I claim and desire to secure by Letters Patent:

1. In a fifth-wheel construction of the kind described, the combination of a frame for the towing vehicle, a fifth wheel mounted on the frame, a kingpin projecting up from said fifth wheel to cooperate with clamping jaws on the trailer frame, a coupling-carriage mounted for orientation about the axis of the kingpin, the forward end of the trailer frame having a guide throat for engaging the kingpin and having a slot to receive the kingpin thereafter to guide the same into the said clamping jaws, a coupling carried on the rear side of the coupling carriage, a second coupling carried in a relatively fixed position on the forward end of the trailer frame to cooperate with the first-named coupling to deliver brake-operating fluid from the towing vehicle to the trailer, said coupling carriage having means movable about the axis of the kingpin extending in a substantially radial direction from the kingpin, and operating when engaged by said guide throat, to pass into the said slot to orient the carriage and the first-named coupling into alignment with the coupling on the trailer.

2. A fifth wheel construction according to claim 1 in which the coupling carriage is provided with a substantially radially disposed rib that passes into the said slot to effect the orienting of the coupling-carriage.

3. In a fifth-wheel construction of the kind described, the combination of a frame for the towing vehicle, a fifth-wheel disc supported on the said frame to rock on a transverse substantially horizontal axis and having a kingpin projecting upwardly therefrom, a coupling carriage centered on said disc with an opening through which the king pin projects, and with anti-friction rollers on the under side thereof rolling on the disc, a hose coupling carried on said carriage toward the rear edge thereof, said carriage having a substantially radially disposed rib on the upper face thereof to cooperate with a part on the forward end of the trailer to orient the carriage into a position in which the said coupling is located substantially in line with the longitudnal axis of the truck.

4. In a fifth-wheel construction of the kind described, the combination of a frame for the towing vehicle, a fifth-wheel member mounted on the frame, a kingpin projecting up from said fifth wheel to cooperate with locking means on the frame of the trailer, a coupling-carriage pivotally mounted on the said fifth wheel member to swing about the axis of the kingpin, a tractor coupling carried by the rear side of the coupling carirage, a trailer coupling carried on the forward end of the trailer frame to cooperate with the first-named coupling to deliver brake-operating fluid from the towing vehicle to the trailer, and automatic means including a part projecting up from the coupling carriage and a converging guide throat on the trailer cooperating when the trailer locking means is swung in to engagement with the kingpin, to swing the carriage on its axis to align the tractor coupling with the trailer coupling.

5. A fifth-wheel construction according to claim 1 in which the said fifth-wheel member on the towing vehicle is pivotally supported on the same on a transverse, substantially horizontal axis on which the coupling carriage can tilt into an inclined position with its rear edge depressed, and including an inclined ramp for guiding the forward end of the traailer up and over the coupling carriage when the towing vehicle is backed in under the forward end of the trailer, the forward end of said ramp having an arcuate depression in which the first named coupling member rests below the upper face of the ramp, said second coupling member being carried by the under side of the forward end of the trailer frame.

6. In a fifth-wheel construction of the kind described, the combination of a frame for the towing vehicle, a fifth-wheel disc supported on said frame to rock on a tranverse, substantially horizontal axis, a coupling carriage of substantially circular form centered on said disc with anti-friction rollers on the underside thereof rolling on the edge of said disc, said carriage having a substantially radially disposed rib on the upper face thereof, a coupling member carried by said coupling carriage, a ramp supported on the truck frame to the rear of said coupling carriage, and having an arcuate recess at its forward end, resilient means associated with said disc capable of holding the same in a tilted position with the rear edge of the coupling carriage depressed into said recess, a trailer having a forwardly projecting frame member, a coupling member on the underside of the trailer frame, rollers at the forward end of the trailer frame to roll up said ramp, across said recess, and onto the upper face of said coupling carriage, said rollers operating to pass off of the upper face of the coupling carriage to permit the bottom face of the forward end of the truck frame to lie flat against the upper side of the coupling carriage to elevate the rear edge of the coupling carriage to the level of the trailer coupling, and means on the trailer cooperating with said rib for orienting the coupling carriage as the towing vehicle is backed under the trailer to bring the first named coupling member into axial alignment with the second coupling member.

7. In a fifth-wheel construction of the kind described, the combination of a tractor vehicle having a chassis frame, a fifth-wheel member mounted on the rear portion of said frame, a coupling carriage mounted on the fifth wheel member to swing on a substantially vertical axis, a tractor coupling member carried on the rear side of said coupling carriage, a trailer with a draft-head at its forward end, a trailer coupling member carried on the under side of said draft-head; and means on the coupling carriage and the draft-head cooperating when the tractor is backed in under the draft-head, to rotate the coupling carriage into a position to align the tractor coupling with the trailer coupling.

8. A fifth-wheel construction according to claim 7 in which the fifth-wheel is of disc form, and the said coupling carriage seats over the same; and with the tractor coupling located below the level of the fifth-wheel.

9. A fifth-wheel construction according to claim 7, including a king pin projecting up from the upper side of the fifth-wheel, and in which the said coupling carriage is mounted to swing around the king pin as an axis, and in which the upper side of the coupling carriage has a radially disposed rib, the forward end of the draft-head having a guide slot for guiding the same on the king pin, and for engaging said rib to orient the coupling carriage into line with the trailer coupling member.

AMOS H. KIRKSEY.

REFERENCES CITED

The following references are of record in the file of this patent:

UNITED STATES PATENTS

| Number | Name | Date |
| --- | --- | --- |
| 1,973,610 | Connors | Sept. 11, 1934 |
| 2,092,115 | Gurton et al. | Sept. 7, 1937 |
| 2,119,460 | Gurton et al. | May 31, 1938 |